United States Patent
Xu et al.

(10) Patent No.: US 9,438,144 B2
(45) Date of Patent: Sep. 6, 2016

(54) SYSTEM AND METHOD FOR FAULT PROTECTION OF A MOTOR

(71) Applicant: GENERAL ELECTRIC COMPANY, Schenectady, NY (US)

(72) Inventors: Fei Xu, ShangHai (CN); Xu Chu, Shanghai (CN); Pengju Kang, Shanghai (CN); Heng Wu, Shanghai (CN); Baoming Huang, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 133 days.

(21) Appl. No.: 14/205,489

(22) Filed: Mar. 12, 2014

(65) Prior Publication Data
US 2014/0265979 A1    Sep. 18, 2014

(30) Foreign Application Priority Data

Mar. 14, 2013   (CN) .......................... 2013 1 0082173

(51) Int. Cl.
  *H02H 7/09*   (2006.01)
  *H02P 6/00*   (2016.01)
  *H02P 6/12*   (2006.01)

(52) U.S. Cl.
  CPC .............. *H02P 6/001* (2013.01); *H02P 6/12* (2013.01)

(58) Field of Classification Search
  CPC ...... H02P 8/36; H02P 29/0044; H02P 29/02; H02P 29/021; H02P 29/024; H02P 29/027; H02P 29/026
  USPC .......................................................... 361/33
  See application file for complete search history.

(56) References Cited

U.S. PATENT DOCUMENTS

| | | |
|---|---|---|
| 5,914,582 A | 6/1999 | Takamoto et al. |
| 6,369,543 B1 | 4/2002 | Masselus et al. |
| 7,193,378 B1 | 3/2007 | Welchko |
| 7,279,862 B1 | 10/2007 | Welchko et al. |
| 7,479,756 B2 | 1/2009 | Kasunich et al. |
| 7,554,276 B2 | 6/2009 | Galli et al. |
| 7,652,858 B2 * | 1/2010 | Tang .................... H02H 7/0838 361/18 |
| 7,791,298 B2 | 9/2010 | Lee et al. |
| 2005/0179419 A1 * | 8/2005 | Ollila .................... H02M 7/493 318/801 |
| 2006/0181239 A1 | 8/2006 | Galli et al. |
| 2008/0304189 A1 | 12/2008 | Tang et al. |

(Continued)

FOREIGN PATENT DOCUMENTS

| | | |
|---|---|---|
| CN | 1289470 A | 3/2001 |
| CN | 101860293 A | 10/2010 |

*Primary Examiner* — Eduardo Colon Santana
*Assistant Examiner* — Bickey Dhakal
(74) *Attorney, Agent, or Firm* — Meagher Emanuel Laks Goldberg & Liao, LLP

(57) ABSTRACT

An exemplary motor driving system includes a power source, a driving circuit, a controller, a motor, and a protection circuit. The driving circuit including at least one switching device coupled with the power source. The motor includes a plurality of windings. The motor is coupled with the driving circuit and driven by the driving circuit. The controller is configured to provide first switch signals to the at least one switching device of the driving circuit in a normal mode. The protection circuit is coupled with the controller, and configured to generate second switch signals based at least in part on a fault signal in a fault mode and provide the second switch signals to the at least one switching device of the driving circuit so as to reconstruct circuit loops between the driving circuit and the plurality of windings. A method for operating the motor driving system is also described.

10 Claims, 12 Drawing Sheets

(56) References Cited

U.S. PATENT DOCUMENTS

| | | | |
|---|---|---|---|
| 2009/0085354 A1* | 4/2009 | Tan | H02P 9/42 290/44 |
| 2009/0195199 A1 | 8/2009 | Ito | |
| 2010/0020581 A1* | 1/2010 | Mazzola | H02M 3/33569 363/132 |
| 2010/0030412 A1* | 2/2010 | Mitsutani | B60L 3/003 701/22 |
| 2010/0251511 A1 | 10/2010 | Clothier et al. | |
| 2010/0253250 A1 | 10/2010 | Marvelly et al. | |
| 2011/0188158 A1 | 8/2011 | Nilson et al. | |
| 2011/0273122 A1 | 11/2011 | Murata et al. | |
| 2011/0310644 A1* | 12/2011 | Ogura | H02M 7/5387 363/55 |
| 2012/0229061 A1* | 9/2012 | Itoh | B60L 3/003 318/400.3 |

* cited by examiner

US 9,438,144 B2

SYSTEM AND METHOD FOR FAULT PROTECTION OF A MOTOR

BACKGROUND

This disclosure generally relates to systems and methods for fault protection of motor.

Permanent magnet (PM) motor is widely used in various fields, for example, the PM motor is used in an electric vehicle (EV) system. A back electromotive force (EMF) voltage is produced in operating the PM motor. When the PM motor is running at a high speed, the back EMF voltage will exceed the voltage on a DC link. If a controller crashes or malfunctions at this situation, the PM motor will work in an uncontrollable generation (UCG) mode. Appropriate control or protection actions should be taken to avoid power source, DC bus capacitor, or power switches from being damaged.

Therefore, it is desirable to provide systems and methods to address at least one of the above-mentioned problems.

BRIEF DESCRIPTION

In accordance with one embodiment disclosed herein, a motor driving system is provided. The motor driving system includes a power source, a driving circuit, a controller, a motor, and a protection circuit. The driving circuit including at least one switching device coupled with the power source. The motor includes a plurality of windings. The motor is coupled with the driving circuit and driven by the driving circuit. The controller is configured to provide first switch signals to the at least one switching device of the driving circuit in a normal mode. The protection circuit is coupled with the controller, and configured to generate second switch signals based at least in part on a fault signal in a fault mode and provide the second switch signals to the at least one switching device of the driving circuit so as to reconstruct circuit loops between the driving circuit and the plurality of windings.

In accordance with another embodiment disclosed herein, a method for operating a motor driving system is provided. The method includes providing first switch signals to a driving circuit in a normal mode. The method includes providing second switch signals to the driving circuit for reconstructing circuit loops between the driving circuit and a motor in a fault mode.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a reasonably concise description of these embodiments, not all features of an actual implementation are described in one or more specific embodiments. Unless defined otherwise, technical and scientific terms used herein have the same meaning as is commonly understood by one of ordinary skill in the art to which this disclosure belongs. The terms "first," "second," "third," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items. The term "coupled" is used to describe electrical connections or couplings, which may be in a direct or indirect manner. The term "circuit" may include either a single component or a plurality of components, which are either active and/or passive components and may be optionally coupled or otherwise coupled together to provide the described function.

As used herein, the terms "may," "can," "may be," and "can be" indicate a possibility of an occurrence within a set of circumstances; a possession of a specified property, characteristic or function; and/or qualify another verb by expressing one or more of an ability, capability, or possibility associated with the qualified verb. Accordingly, usage of "may," "can," "may be," and "can be" indicate that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may," "can," "may be," and "can be".

Figure 1:
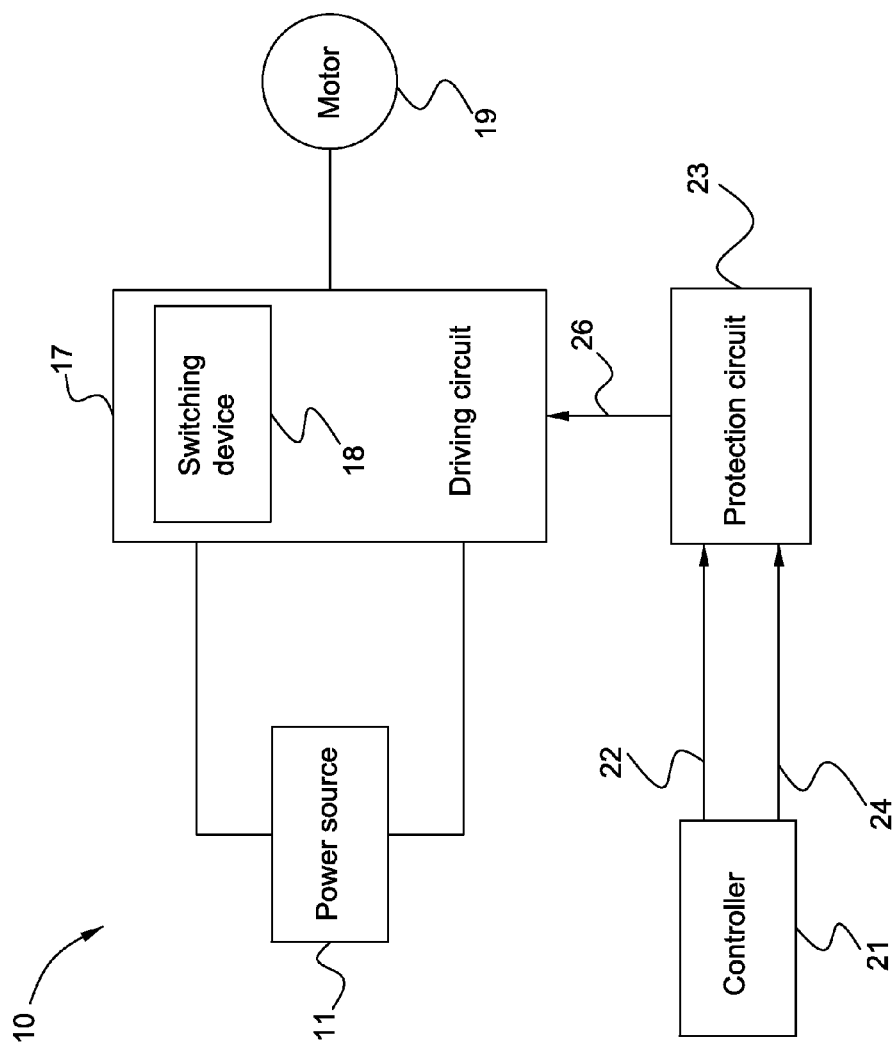
FIG. 1 is a block diagram of a motor driving system in accordance with one exemplary embodiment of the present disclosure.

FIG. 1 is a block diagram of a motor driving system 10 in accordance with one exemplary embodiment of the present disclosure. The motor driving system 10 includes a power source 11, a driving circuit 17, a motor 19, a controller 21, and a protection circuit 23.

The power source 11 may include a DC power source or an AC power source for providing an electrical power. In some embodiments, the motor 19 includes a permanent magnet (PM) motor with a plurality of windings. In some embodiments, the motor 19 includes other kinds of motor such as an induction motor (IM).

In the illustrated embodiment, the driving circuit 17 is coupled between the power source 11 and the motor 19. The driving circuit 17 includes at least one switching devices 18 which are arranged to constitute certain architectures. The driving circuit 17 is configured for converting the electrical power provided by the power source 11 into a proper electrical power for providing to the motor 19. The at least one switching device 18 in the driving circuit 17 is capable of being turned on or turned off so as to control a motor speed.

In the illustrated embodiments, a switch driver (not shown) is an internal component integrated with the switching device 18. In other embodiments, the switch driver is an external component coupled with switching device 18. The switch driver is configured to drive the switching device 18.

Non-limiting examples of the switching device 18 may include a metal-oxide-semiconductor field-effect transistor (MOSFET), an insulated gate bipolar transistor (IGBT), and any other suitable devices.

The controller 21 is in electrical communication with at least one of the power source 11, the driving circuit 17, and the motor 19 for providing control signals. In some embodiments, the controller 21 may include any suitable programmable circuits or devices such as a digital signal processor (DSP), a field programmable gate array (FPGA), a programmable logic controller (PLC), and an application specific integrated circuit (ASIC). In some embodiments, the controller 21 may be implemented in the form of hardware, software, or a combination of hardware and software. In one embodiment, the controller 21 is configured to generate first switch signals 22 and a fault signal 24.

The motor speed is regulated by operating the driving circuit 17 according to first switch signals 22 provided by the controller 21 in a normal mode. When a fault occurs in the motor driving system 10 in a fault mode, damages may be brought to the power source 11, the driving circuit 17, and/or the motor 19. For example, when the motor speed is higher than an upper threshold speed, one or more components in the motor driving system 10 may be damaged due to large voltage/current and/or high temperature caused by operating the motor 19 under an over-speed condition. Therefore, the protection circuit 23 is proposed in this embodiment for operating the motor 19 in a safe manner.

In the normal mode, the fault signal 24 is invalid which indicates that no fault occurs in the motor driving system 10. The protection circuit 23 receives the invalid fault signal 24 and functions as a conductor to allow the first switch signals 22 to be provided to the at least one switching device 18 of the driving circuit 17 directly. The first switch signals 22 are used to turn on or turn off the at least one switching device 18 of the driving circuit 17 so as to control the motor speed.

In the fault mode, the fault signal 24 is valid which indicates that at least one fault occurs in the motor driving system 10. The fault may include an over-speed condition, an overcurrent condition, an overvoltage condition, or any other abnormal conditions that can make the motor 19 lose control.

The protection circuit 23 receives the valid fault signal 24 and is enabled. The protection circuit 23 is configured to block the first switch signals 22 and generate second switch signals 26. The second switch signals 26 are provided to the at least one switching device 18 of the driving circuit 17. The second switch signals 26 are used to reconstruct circuit loops between the driving circuit 17 and windings of the motor 19. In some embodiments, the circuit loops are specifically reconstructed in a manner that one or more short circuits are formed such that overvoltage, overcurrent, and/or high temperature problems caused by the over-speed fault can be mitigated. Then the motor driving system 10 can restore from the fault mode to the normal mode.

More specifically, when the motor speed goes down to a value that is lower than the threshold value, the first switch signals 22 will pass through the protection circuit 23 to the driving circuit 17 and drive the at least one switching device 18. In some embodiments, the motor 19 can be stopped in a safe manner according to the first switch signals 22.

The protection circuit 23 can be implemented in the form of hardware, software, or a combination of hardware and software. In some embodiments, the protection circuit 23 is an independent circuit coupled with the controller 21. In some embodiments, the protection circuit 23 is an internal module of the controller 21. The forms of the second switch signals 26 are based at least in part on the architectures of the driving circuit 17. Specific details as to how the first switch signals 22 and the second switch signals 26 are generated will be discussed below.

Figure 2:
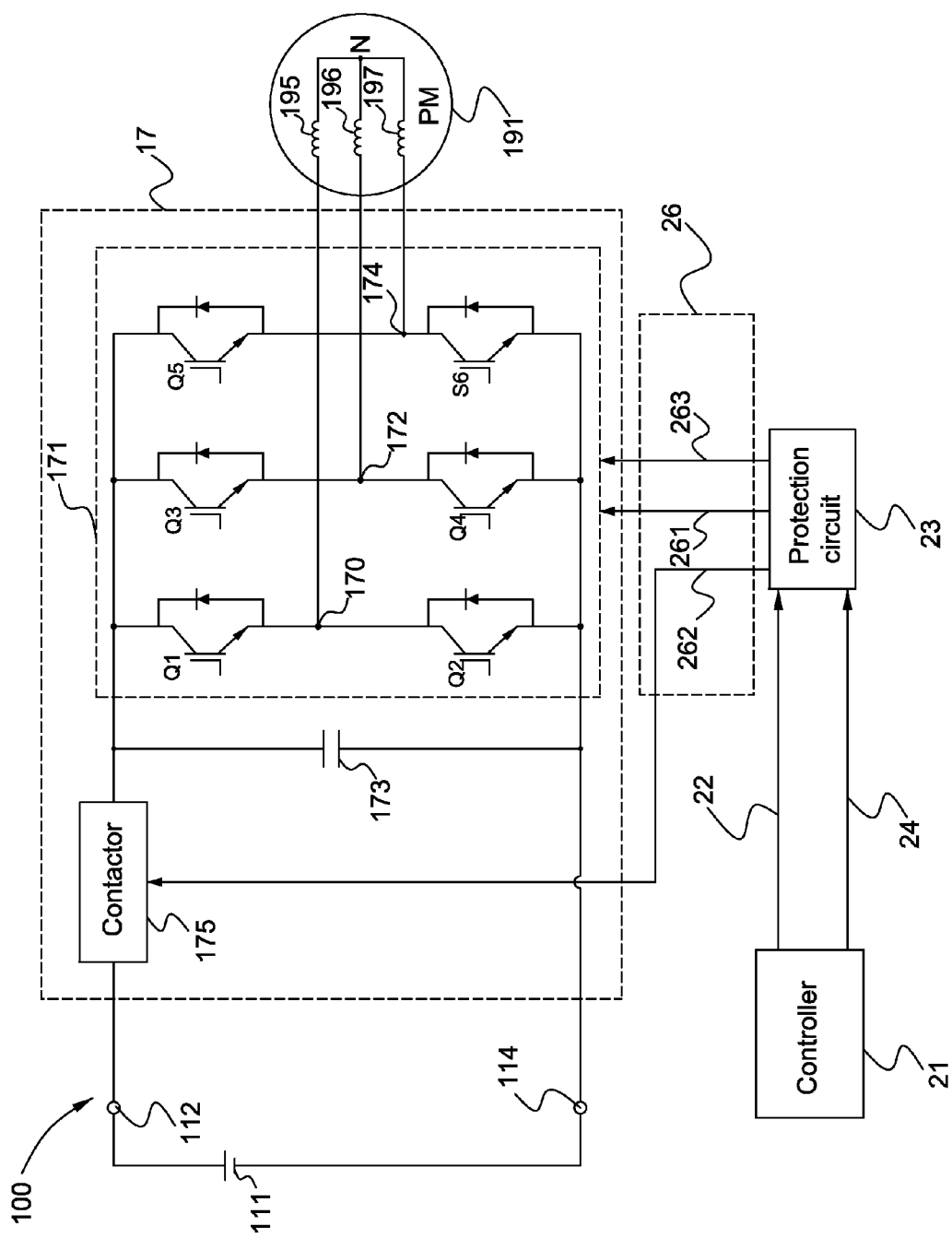
FIG. 2 is a schematic diagram of a motor driving system with a DC/AC inverter in the driving circuit shown in FIG. 1 in accordance with one exemplary embodiment of the present disclosure.

FIG. 2 is a schematic diagram of a motor driving system with a DC/AC inverter in the driving circuit of FIG. 1 in accordance with one exemplary embodiment of the present disclosure. In the embodiment of FIG. 2, the motor driving system 100 includes a battery 111, the driving circuit 17, a PM motor 191, the controller 21, and the protection circuit 23.

In the illustrated embodiment, the battery 111 is used as the power source 11. In other embodiments, flywheels, ultra-capacitors, and fuel cells may be used as the power source 11. The battery 111 is coupled to the driving circuit 17 via a high-voltage terminal 112 and a low-voltage terminal 114. The PM motor 191 is used as the motor 19. The battery 111 is used to provide power to the PM motor 191 or receive power from the PM motor 191 via the driving circuit 17. In one embodiment, the driving circuit 17 includes a DC/AC inverter 171, a capacitor 173, and at least one contactor 175. The capacitor 173 is coupled in parallel with the battery 111.

More specifically, in this embodiment, the PM motor 191 includes a three-phase PM motor with a first winding 195, a second winding 196, and a third winding 197 coupled to a common point N.

In the illustrated embodiment, the DC/AC inverter 171 is a three-phase DC/AC inverter which includes three bridge legs and each bridge leg includes two switching devices. The DC/AC inverter 171 is configured to convert DC electrical power provided from the battery 111 to three-phase AC electrical power which is supplied to the PM motor 191. In other embodiments, the DC/AC inverter 171 may include single-phase or multi-phase inverters which are configured to provide single-phase or multi-phase AC electrical power to the PM motor 191.

Each switching device is coupled with an anti-parallel diode. A first bridge leg includes a first switch $Q_1$ and a second switch $Q_2$. A second bridge leg includes a third switch $Q_3$ and a fourth switch $Q_4$. A third bridge leg includes a fifth switch $Q_5$ and a sixth switch $Q_6$. The first, third, fifth switches $Q_1$, $Q_3$, and $Q_5$ (collectively referred to as upper switches) are commonly coupled to the high-voltage terminal 112. The second, fourth, sixth switches $Q_2$, $Q_4$, and $Q_6$ (collectively referred to as lower switches) are commonly coupled to the low-voltage terminal 114. The first winding 195 is coupled with a first junction 170 between the first switch $Q_1$ and the second switch $Q_2$ in the first bridge leg. The second winding 196 is coupled with a second junction 172 between the third switch $Q_3$ and the fourth switch $Q_4$ in the second bridge leg. The third winding 197 is coupled with a third junction 174 between the fifth switch $Q_5$ and the sixth switch $Q_6$ in the third bridge leg.

The at least one contactor 175 is coupled in series between the battery 111 and the DC/AC inverter 171. The at least one contactor 175 includes a single contactor coupled with the high-voltage terminal 112 shown in FIG. 2. In some embodiments, the at least one contactor 175 may include a first contactor and a second contactor coupled with the high-voltage terminal 112 and the low-voltage terminal 114 of the battery 111 respectively. In the fault mode, the at least one contactor 175 can be tripped manually or automatically to cut off the electrical connection between the battery 111 and the PM motor 191, such that the battery 111 can be protected.

In the normal mode, the first switch signals 22 are generated by implementing one or more control algorithms such as PWM modulation algorithms. The first switch signals 22 are used for turning on or turning off the plurality of switches $Q_1$, $Q_3$, $Q_5$, $Q_2$, $Q_4$, and $Q_6$ so as to regulate the voltage and/or current provided to the PM motor 191. In the normal mode, the fault signal 24 is invalid. After receiving the invalid fault signal 24, the protection circuit 23 is operated as a conductor to allow the first switch signals 22 to be provided to the DC/AC inverter 171.

In the fault mode especially the UCG mode, when the speed of the PM motor 191 is higher than a predetermined or threshold speed, the fault signal 24 is valid. The protection circuit 23 is enabled after receiving the valid fault signal 24. The protection process is then implemented in the following procedures. The first switch signals 22 provided from the controller 21 are blocked. The second switch signals 26 are generated by the protection circuit 23. In this embodiment of FIG. 2, the second switch signals 26 includes a first turn-on signal 261, an open signal 262, and a second turn-on signal 263.

The first turn-on signal 261 is provided to a first half of the DC/AC inverters. In some embodiments, the first turn-on signal 261 can be implemented in the form of a plurality of turn-on signals, each of the plurality of the turn-on signals can be sent to each corresponding switching device. For example, in one embodiment, the first turn-on signal 261 is provided to the upper switches $Q_1$, $Q_3$, and $Q_5$ (or provided to the lower switches $Q_2$, $Q_4$, and $Q_6$). First short-circuit loops are formed among $Q_1$, $Q_3$, and $Q_5$ and the PM motor 191 (or among $Q_2$, $Q_4$, and $Q_6$ and the PM motor 191). That is, one switch in each bridge leg share a short current with the PM motor 191.

The open signal 262 is provided to the at least one contactor 175 to cut off the battery 111 from the DC/AC inverter 171. In some embodiments, the first turn-on signal 261 and the open signal 262 are substantially simultaneously provided to the first half switches and the at least one contactor 175, respectively.

After the contactor 175 is tripped, the second turn-on signal 263 is provided to the other half of the switching devices. In some embodiments, the second turn-on signal 263 can be implemented in the form of a plurality of turn-on signals, each of the plurality of the turn-on signals can be sent to each corresponding switching device. For example, the second turn-on signal 263 is provided to the lower switches $Q_2$, $Q_4$, and $Q_6$ (or the upper switches $Q_1$, $Q_3$, and $Q_5$). Then the upper switches $Q_1$, $Q_3$, and $Q_5$ and the lower switches $Q_2$, $Q_4$, and $Q_6$ form second short-circuit loops with the PM motor 191. That is, both of the two switches in each bridge leg share the short current with the PM motor 191.

The one or more short circuits formed with the one or more turned-on switches and motor windings can allow the energy generated due to false operation of the PM motor 191 to be consumed. As a result, the back EMF voltage can be decreased. After the speed of the PM motor 191 decreases to a value that is lower than a threshold speed, the back EMF voltage will decrease correspondingly to a safe value. In this situation, all the switches in the DC/AC inverter 171 can be turned off safely.

Figure 3:
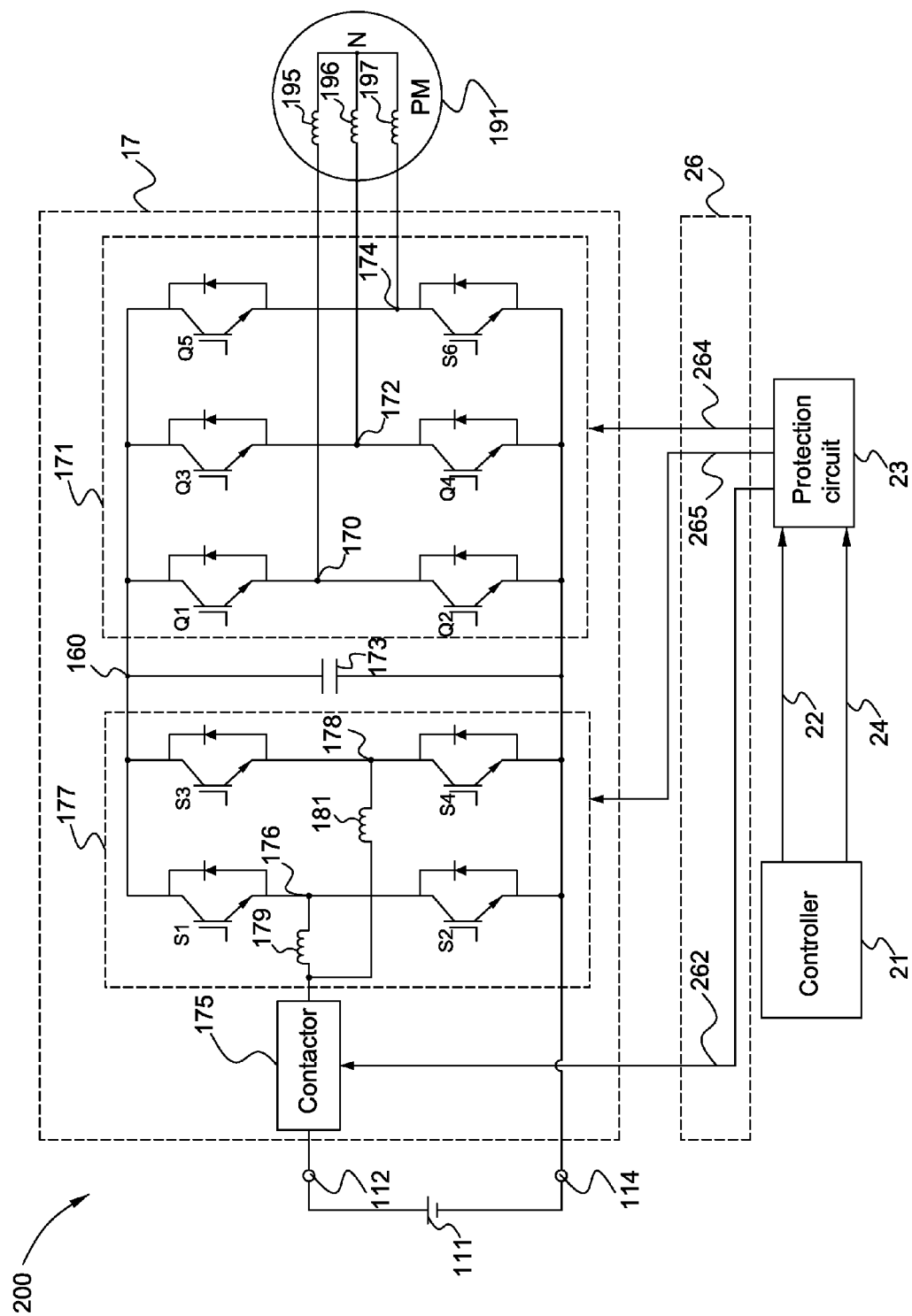
FIG. 3 is a schematic diagram of a motor driving system with a DC/DC converter and a DC/AC inverter in the driving circuit shown in FIG. 1 in accordance with another exemplary embodiment of the present disclosure.

FIG. 3 is a schematic diagram of a motor driving system 200 with a DC/DC converter 177 and a DC/AC inverter 171 in the driving circuit 17 of FIG. 1 in accordance with another exemplary embodiment of the present disclosure. Compared with the motor driving system 100 shown in FIG. 2, similarly, the battery 111 is used as the power source 11, the PM motor 191 is used as the motor 19, thus, the detailed description of the battery 111 and the PM motor 191 are omitted here.

However, the driving circuit 17 of the motor driving system 200 employs two-stage structure for performing power conversion between the battery 111 and the PM motor 191. More specifically, the driving circuit 17 of the motor driving system 200 includes the DC/AC inverter 171, a DC/DC converter 177, the at least one contactor 175, and the capacitor 173. In the illustrated embodiment, the DC/DC converter 177 includes a bidirectional DC/DC converter which is configured to perform power conversions. In other embodiments, the DC/DC converter 177 may include a unidirectional DC/DC converter.

In the illustrated embodiments, the DC/DC converter 177 includes an H bridge, a first inductor 179, and a second inductor 181. The H bridge includes a first upper switch $S_1$ and a first lower switch $S_2$ coupled in series in a left bridge leg. The H bridge includes a second upper switch $S_3$ and a second lower switch $S_4$ coupled in series in a right bridge leg. The upper switches $S_1$ and $S_3$ are coupled to a common point 160. The lower switches $S_2$ and $S_4$ are commonly coupled to the low-voltage terminal 114. The first inductor 179 is coupled between the high-voltage terminal 112 and a junction 176 between the first upper switch $S_1$ and the first lower switch $S_2$. The second inductor 181 is coupled between the high-voltage terminal 112 and a junction 178 between the second upper switch $S_3$ and the second lower switch $S_4$.

The DC/AC inverter of this embodiment is similar to the DC/AC inverter 171 shown in FIG. 2. While the upper switches ($Q_1$, $Q_3$ and $Q_5$) are commonly coupled to the common point 160. Thus, the detailed description of the DC/AC inverter 171 is omitted here. The capacitor 173 is coupled between the DC/DC converter 177 and the DC/AC inverter 171 with one terminal coupled to the common point 160 and another terminal coupled to the low-voltage terminal 114. The at least one contactor 175 is coupled in series between the battery 111 and the DC/DC converter 177.

In the normal mode, the first switch signals 22 are generated according to the PWM modulation algorithms for turning on or turning off the plurality of switches of the DC/AC inverter 171 and the plurality of switches of the DC/DC converter 177. Then the DC/DC converter 177 is controlled to convert the DC power provided by the battery 111 into a proper DC power at two terminals of the capacitor 173. The DC/AC inverter 171 is controlled to convert the proper DC power into the AC power for providing to the PM motor 191. Finally, voltage and/or current provided to the PM motor 191 can be regulated and the speed of the PM motor 191 can be controlled. In normal operation, the fault signal 24 is invalid indicating that no fault is occurring. After receiving the invalid fault signal 24, the protection circuit 23 is operated as a conductor to allow the first switch signals 22 to be provided to the DC/AC inverter 171 and the DC/DC converter 177 directly.

In the fault mode especially the UCG mode, when the speed of the PM motor 191 is higher than a predetermined speed, the fault signal 24 is valid. The protection circuit 23 is enabled after receiving the valid fault signal 24. The protection process is then implemented in the following procedures. The first switch signals 22 provided from the controller 21 are blocked from being supplied to the driving circuit 17. The second switch signals 26 are generated by the protection circuit 23. In this embodiment of FIG. 3, the second switch signals 26 include a turn-off signal 264, an open signal 262, and a turn-on signal 265.

The turn-off signal 264 is provided to all the switches of the DC/AC inverter 171 to make the DC/AC inverter 171 behave as a full bridge rectifier. In some embodiments, the turn-off signal 264 can be implemented in the form of a plurality of turn-off signals, each of the plurality of the turn-off signals can be sent to each corresponding switching device. The open signal 262 is provided to the at least one contactor 175 to cut off the battery 111 from the PM motor 191.

The turn-on signal 265 is provided to $S_1$ and $S_4$, or to $S_2$ and $S_3$ to conduct the first inductor 179 and the second inductor 181. In some embodiments, the turn-on signal 265 can be implemented in the form of a plurality of turn-on signals, each of the plurality of the turn-on signals can be sent to each corresponding switching device. Short-circuit loops can be formed among the first inductor 179, the second inductor 181, the DC/AC inverter 171, and the PM motor 191. In some embodiments, the turn-off signal 264, the open signal 262, and the turn-on signal 265 are provided to the driving circuit 17 substantially simultaneously.

Figure 4:
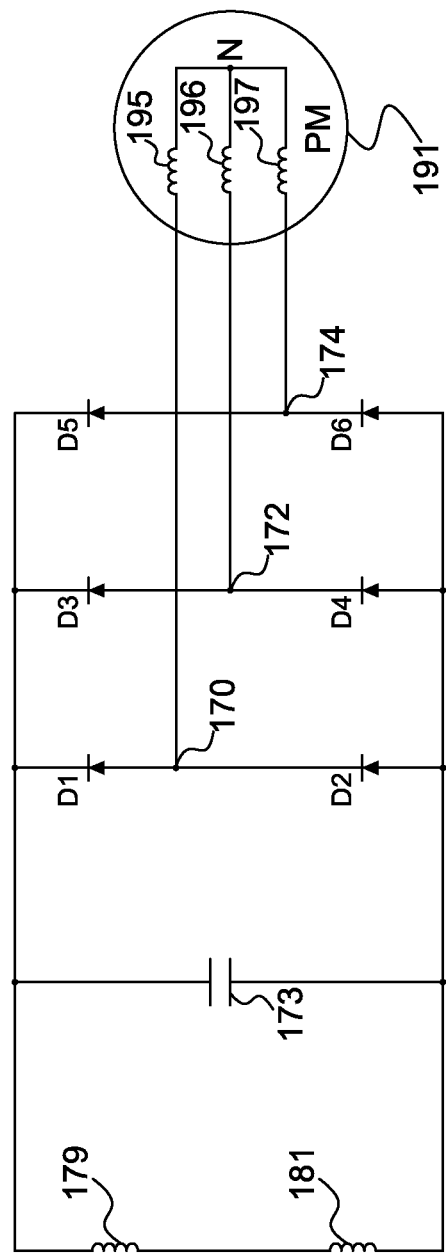
FIG. 4 illustrates circuit loops formed in a fault mode of FIG. 3 in accordance with one exemplary embodiment of the present disclosure.

An equivalent circuit of the motor driving system 200 of FIG. 3 operating in the fault mode or the UCG mode is shown in FIG. 4. After the second switch signals 26 shown in FIG. 3 are provided to the driving circuit 17, the diodes ($D_1$ to $D_6$), the first inductor 179, the second inductor 181, the capacitor 173, and the PM motor 191 form short-circuit loops in the motor driving system 200.

As shown in FIG. 4, in the UCG mode, the electrical power from the PM motor 191 can flow into the first inductor 179 and the second inductor 181. Thus large power produced by the high back EMF voltage can be consumed in the first inductor 179 and the second inductor 181. After the speed of the PM motor 191 decreases to a threshold speed, the back EMF voltage will decrease correspondingly to a safe value and all the switches in the DC/AC inverter 171 and the DC/DC converter 177 can be turned off safely.

Figure 5:
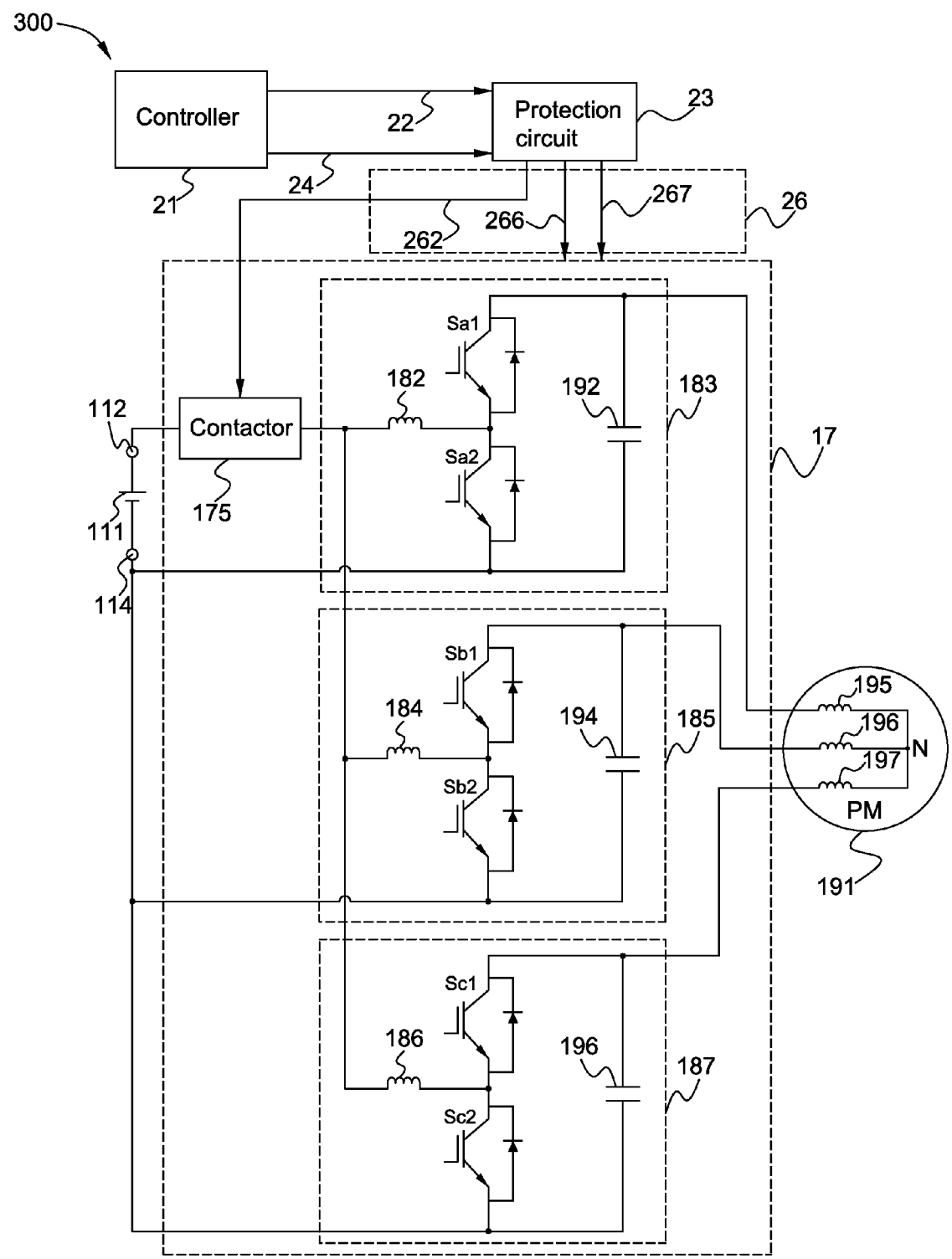
FIG. 5 is a schematic diagram of a motor driving system with a plurality of independent DC/DC converters in the driving circuit shown in FIG. 1 in accordance with another exemplary embodiment of the present disclosure.

FIG. 5 is a schematic diagram of a motor driving system 300 with independent DC/DC converters in the driving circuit of FIG. 1 in accordance with another exemplary embodiment of the present disclosure. Compared with the motor driving system 100 shown in FIG. 2, similarly, the battery 111 is used as the power source 11, the PM motor 191 is used as the motor 19, thus, the detailed description of the battery 111 and the PM motor 191 are omitted here.

However, the driving circuit 17 in FIG. 5 includes a first DC/DC converter 183, a second DC/DC converter 185, and a third DC/DC converter 187, and the at least one contactor 175. The first, second, and third DC/DC converters 183, 185, 187 collectively function as a single stage converter which is configured to have the capability of converting DC power provided form the battery 111 into DC power as well as boosting the voltage level of the DC power.

Each of the first, second, and third DC/DC converters 183, 185, 187 is coupled with a corresponding winding of the PM motor 191. Each of the he first, second, and third DC/DC converters 183, 185, 187 includes an upper switch (e.g., $S_{a1}$), a lower switch (e.g., $S_{a2}$), an inductor (e.g., 182), and a capacitor (e.g., 192). Each upper switch is coupled with a corresponding winding of the PM motor 191. The lower switches are commonly coupled to the low-voltage terminal 114. Each inductor is coupled between the battery 111 and a corresponding junction between each upper switch and each lower switch. Each capacitor is coupled with each upper switch and the low-voltage terminal 114. By using the plurality of independent DC/DC converters, each winding of the PM motor 191 can be controlled independently. The at least one contactor 175 is coupled in series between the battery 111 and the independent DC/DC converters (183, 185, and 187).

In the normal mode, the first switch signals 22 are generated according to the PWM modulation algorithms for turning on or turning off the plurality of switches ($S_{a1}$, $S_{a2}$, $S_{b1}$, $S_{b2}$, $S_{c1}$, and $S_{c2}$,) of the driving circuit 17. The voltage (phase voltage) ideally imposed on the terminals of each capacitor consists of two distinct components: a DC bias component (the same for each phase) and an AC component. The AC component for each phase has the same amplitude and each AC component includes a 120 degree shift with respect to AC components in other phases. The voltage on the terminals of each capacitor can be expressed as the following equations:

$$V_{ph\_A} = V_{bias} + V_m \sin(\omega t) \qquad (1),$$

$$V_{ph\_B} = V_{bias} + V_m \sin(\omega t - 120°) \qquad (2),$$

$$V_{ph\_C} = V_{bias} + V_m \sin(\omega t + 120°) \qquad (3).$$

Where $V_{ph\_A}$, $V_{ph\_B}$, and $V_{ph\_C}$ refer to the voltage on the terminals of capacitors 192, 194, and 196 respectively. $V_{bias}$ refers to the DC bias voltage. $V_m$ refers to the amplitude of the AC component. The controller 21 is configured to generate the first switch signals 22 for providing to the independent DC/DC converters 183, 185, and 187 to track a corresponding reference so as to obtain $V_{ph\_A}$, $V_{ph\_B}$, and $V_{ph\_C}$ respectively. That is, reference of each DC/DC converter has a 120 degree shift. The reference can be a DC value or an AC value. When $V_m$ is smaller than $V_{bias}$, the references are DC voltage. Otherwise, the references are AC voltage.

Then the output line-line voltage can be obtained as the following equations:

$$V_{AB}=V_{ph\_A}-V_{ph\_B}=\sqrt{3}V_m \sin(\omega t+30°) \quad (4),$$

$$V_{BC}=V_{ph\_B}-V_{ph\_C}=\sqrt{3}V_m \sin(\omega t-90°) \quad (5),$$

$$V_{CA}=V_{ph\_C}-V_{ph\_A}=\sqrt{3}V_m \sin(\omega t+150°) \quad (6).$$

Where $V_{AB}$, $V_{BC}$, and $V_{CA}$ refer to the voltage between lines A and B, lines B and C, and lines C and A respectively. Thus, the first, second, and third of the DC/DC converters 183, 185, and 187 can be used to convert the DC power provided by the battery 111 into AC power for providing to the PM motor 191 independently. Finally, voltage and/or current provided to the PM motor 191 can be regulated and the speed of the PM motor 191 is in control. In the normal mode, the fault signal 24 is invalid. After receiving the invalid fault signal 24, the protection circuit 23 is operated as a conductor to allow the first switch signals 22 to be provided to the plurality of the independent DC/DC converters directly.

Figure 6:
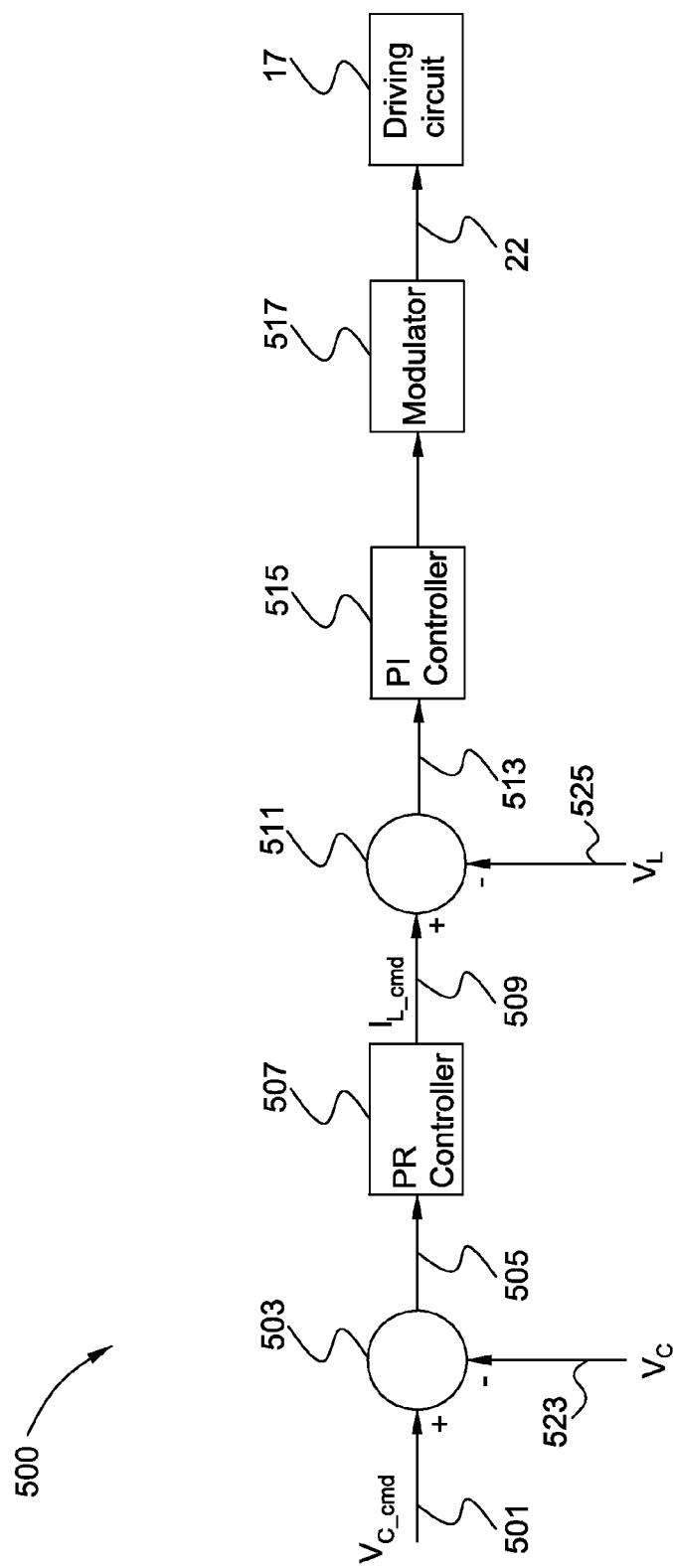
FIG. 6 is a control block diagram used in controlling each DC/DC converter of FIG. 5 by implementing a PR algorithm in accordance with one exemplary embodiment of the present disclosure.

FIG. 6 is a control block diagram 500 used in controlling each DC/DC converter of FIG. 5 by implementing a PR algorithm in accordance with one exemplary embodiment of the present disclosure. The control method is used in each phase driving module. For example, a first phase driving module is composed of the battery 111, the DC/DC converter 183 and the first winding 195. Some sensors are used to measure a voltage of the capacitor 192 and a current of the inductor 182, then output a capacitor voltage signal $V_C$ 523 and an inductance current signal $I_L$ 525 respectively. The control block diagram 500 is used to allow $V_C$ 519 to track a voltage command signal $V_{C\_cmd}$ 501.

In the illustrated embodiment of FIG. 6, a first difference signal 505 is generated by a subtraction of $V_{C\_cmd}$ 501 and $V_C$ 523 via a summation element 503. The first difference signal 505 is regulated via a PR controller 507. The PR algorithm can be expressed by the following transfer function:

$$G(s) = K_p + \frac{K_R s}{s^2 + \omega_0^2} \quad (7)$$

Where $K_p$ refers to a proportional coefficient. $K_R$ refers to a resonant coefficient. $\omega_0$ refers to a resonant frequency. Then a signal generated by the PR controller 507 is used as a current command signal $I_{L\_cmd}$ 509.

A second difference signal 513 is generated by a subtraction of $I_{L\_cmd}$ 509 and $I_L$ 525 via a summation element 511. The second difference signal 513 is regulated via a PI controller 515. In some embodiments, the PI controller 515 can be replaced by other control algorithms. Then an output of the PI controller 515 is sent to a modulator 517 to get the first switch signals 22. The first switch signals 22 are provided to the driving circuit 17 (e.g., the DC/DC converter 183).

Figure 7:
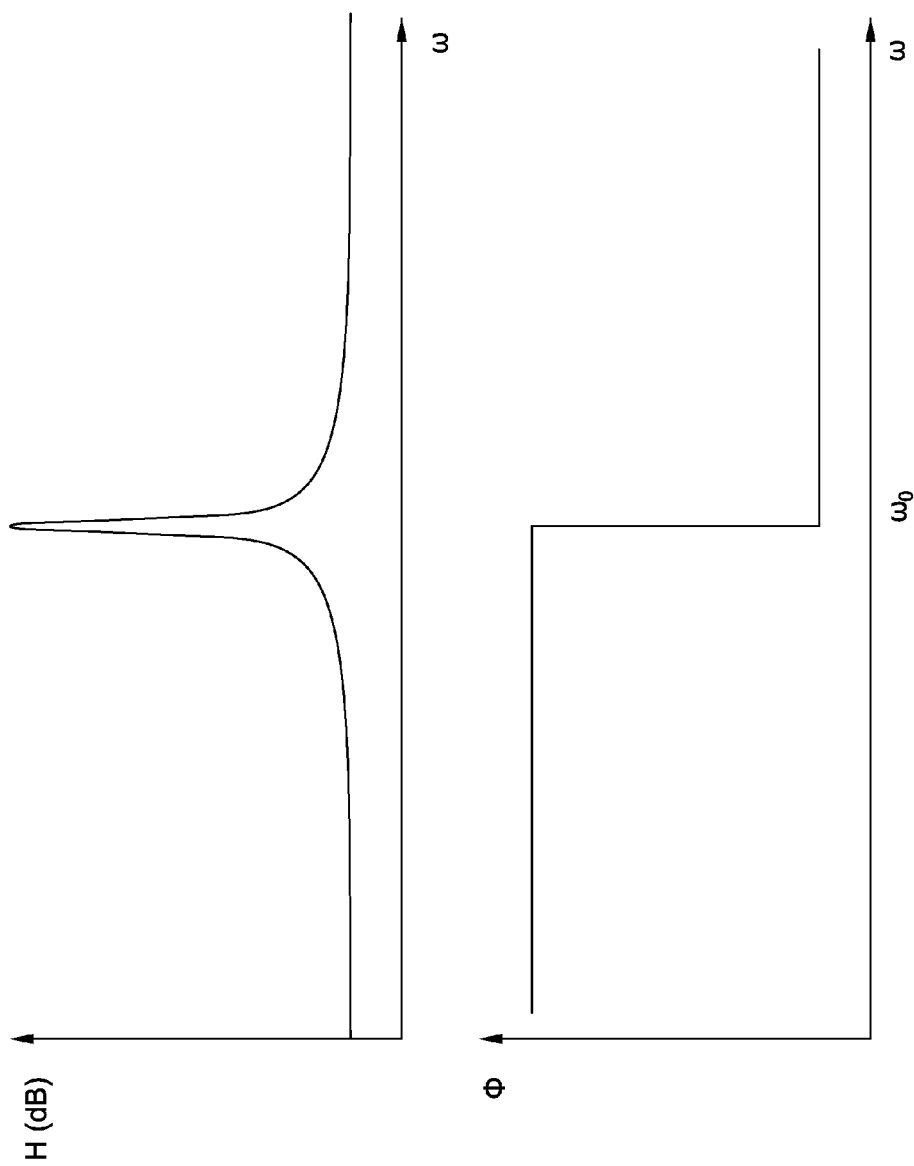
FIG. 7 is a bode diagram generated by a PR controller shown in FIG. 6 used in the motor driving system of FIG. 5 in accordance with one exemplary embodiment of the present disclosure.

FIG. 7 is a bode diagram of the PR controller. Due to the function of the part $$\frac{K_R s}{s^2 + \omega_0^2}$$

of the PR algorithm illustrated in equation (7), the gain response of G (s) can reach an infinite value at the resonant frequency $\omega_0$, and the gain has no or minor attenuation except for the $\omega_0$. The frequency response of G (s) has a sharp decrease at $\omega_0$. Thus the PR controller can be used to increase a gain or a bandwidth of the motor driving system 300 and regulate the phase margin to ensure that the motor driving system 300 can be controlled stably by choosing a proper resonant frequency $\omega_0$.

In the fault mode especially the UCG mode, when the speed of the PM motor 191 is higher than a predetermined speed, the fault signal 24 is valid. The protection circuit 23 is enabled after receiving the valid fault signal 24. The protection process is then implemented in the following procedures. The first switch signals 22 are blocked from the controller 21. The second switch signals 26 are generated by the protection circuit 23. In this embodiment of FIG. 5, the second switch signals 26 include a turn-on signal 266, the open signal 262, and a turn-off signal 267.

The turn-on signal 266 is provided to each upper switch of each DC/DC converter. In some embodiments, the turn-on signal 266 can be implemented in the form of a plurality of turn-on signals, each of the plurality of the turn-on signals can be sent to each corresponding switching device. The open signal 262 is provided to the at least one contactor 175 to cut off the battery 111 from the PM motor 191. The turn-off signal 267 is provided to each lower switch of each converter. In some embodiments, the turn-off signal 267 can be implemented in the form of a plurality of turn-off signals, each of the plurality of the turn-off signals can be sent to each corresponding switching device. Short-circuit loops can be formed among inductors 182, 184, 186 and the PM motor 191. In some embodiments, the turn-on signal 266, the open signal 262, and the turn-off signal 267 are provided to the driving circuit 17 substantially simultaneously.

Figure 8:
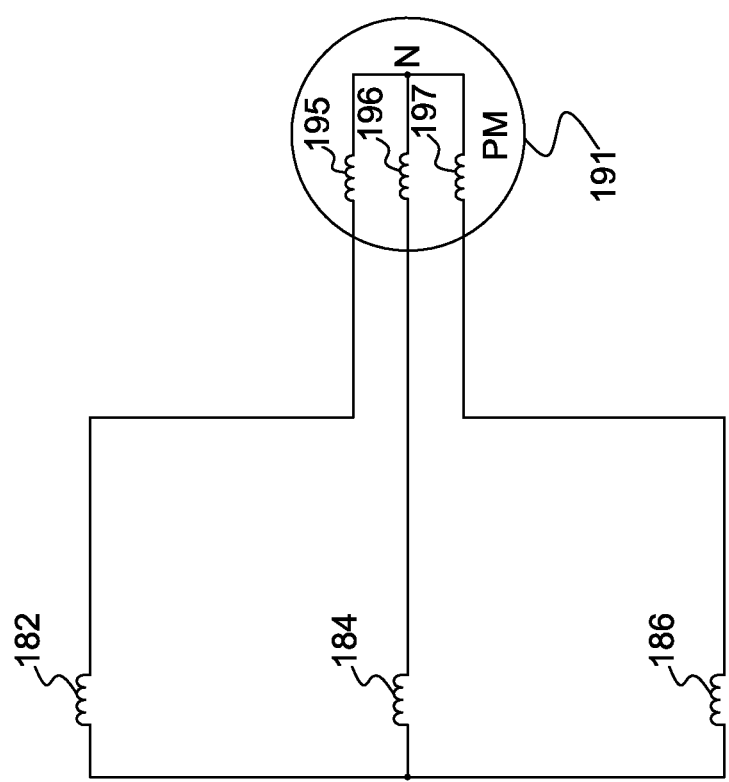
FIG. 8 illustrates circuit loops formed in the fault mode of FIG. 5 in accordance with one exemplary embodiment of the present disclosure.

An equivalent circuit of the motor driving system of FIG. 5 in the fault mode is shown in FIG. 8. After the second switch signals 26 shown in FIG. 5 are provided to the driving circuit 17, the inductors 182, 184, 186 and the PM motor 191 form short-circuit loops in the motor driving system 300.

In the UCG mode, the electrical power from the PM motor 191 can be provided into the inductors 183, 185, and 187. Thus large power produced by the high back EMF voltage can be consumed in the inductors 183, 185, and 187. After the speed of the PM motor 191 decreases to a value that is lower than a threshold speed, the back EMF voltage will decrease correspondingly to a safe value, and all the switches can be turned off safely.

Figure 9:
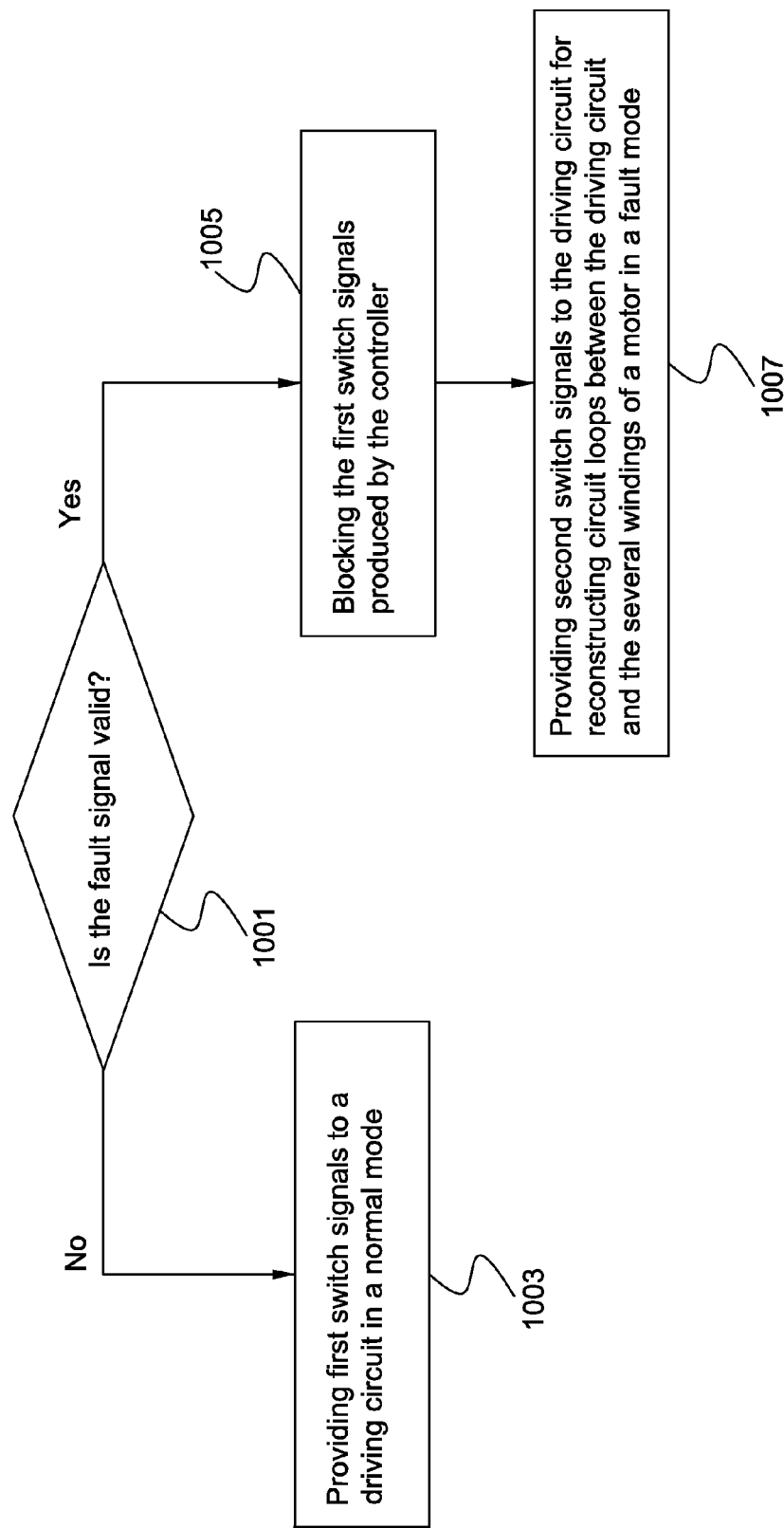
FIG. 9 is a flowchart of a method for operating the motor driving system of FIG. 1 in accordance with one exemplary embodiment of the present disclosure.

FIG. 9 is a flowchart of a method for operating a motor driving system of FIG. 1 in accordance with one exemplary embodiment of the present disclosure. Combined with the motor driving system 10 of FIG. 1, the method may start from block 1001. At block 1001, sensors are used to detect voltage, current, or motor speed and output a feedback signal for providing to a controller 21.

A fault signal 24 is determined by a comparison of the feedback signal with a predetermined value. For example, when the speed sensor is used to measure the motor speed, a feedback speed signal is compared with a predetermined speed. When the feedback speed signal is higher than the predetermined speed, the controller 21 outputs a valid fault signal 24. Otherwise, the controller 21 outputs an invalid fault signal 24. The valid fault signal 24 represents a fault mode, and the invalid fault signal 24 represents a normal mode. The fault mode includes the UCG mode when the motor speed is too high and large back EMF voltage exists in the motor 19 in particular for the PM motor.

When the fault signal 24 is invalid, that is the motor driving system 10 is operated in the normal mode, the process goes to block 1003. At block 1003, first switch signals 22 provided by the controller 21 are sent to the driving circuit 17. A protection circuit 23 is operated as a conductor to allow the first switch signals 22 to be provided to the driving circuit 17 directly. Then the motor speed can be controlled by regulating the voltage and/or current provided to the motor 19 via turning on or turning off the at least one switching device 18 of the driving circuit 17. The first switch signals 22 are generated according to a plurality of architectures of the driving circuit 17.

When the fault signal is valid, that is the motor driving system 10 is operated in the fault mode, the process goes to block 1005. At block 1005, the protection circuit 23 is enabled after receiving the valid fault signal 24 and the first switch signals 22 produced by the controller 21 are blocked. Then the process goes to block 1007, at block 1007, the second switch signals 26 generated by the protection circuit 23 are provided to the driving circuit 17 for reconstructing circuit loops between the driving circuit 17 and windings of the motor 19. The second switch signals 26 are generated according to the plurality of architectures of the driving circuit 17.

Figure 10:
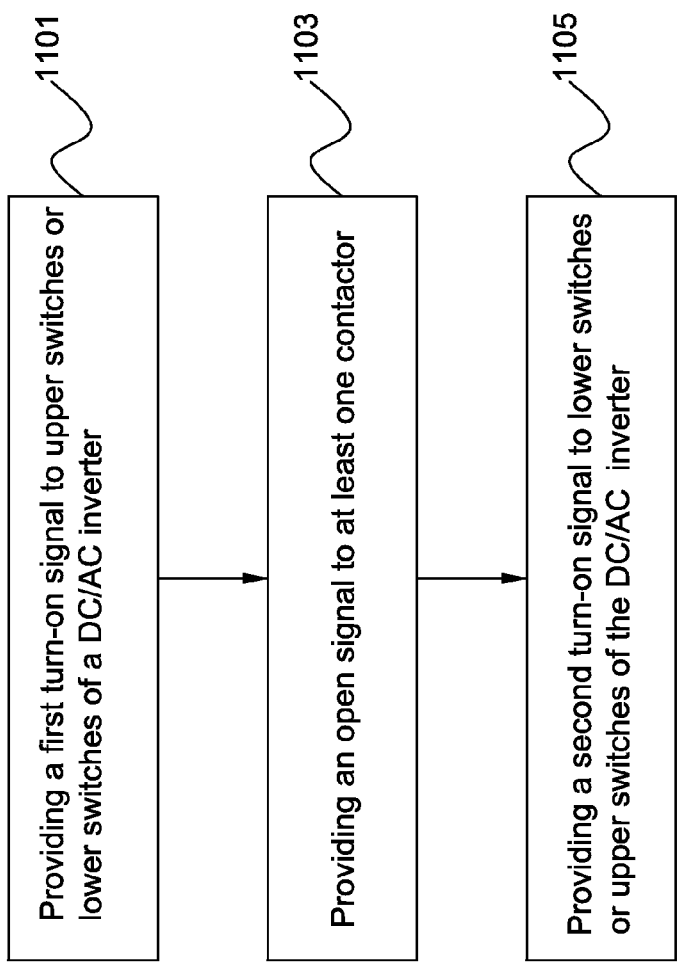
FIG. 10 is a flowchart illustrating sub-steps of providing second switch signals shown in FIG. 9 in accordance with one exemplary embodiment of the present disclosure.

FIG. 10 is a flowchart illustrating sub-steps of providing second switch signals shown in FIG. 9 in accordance with one exemplary embodiment of the present disclosure. Combined with the motor driving system 100 shown in FIG. 2, the method for operating the motor driving system 100 with the second switch signals 26 includes the following procedures.

At block 1101, a first turn-on signal 261 is provided to upper switches or lower switches of a DC/AC converter 171 to form first short-circuit loops between the upper switches or lower switches and the windings of the PM motor 191. At block 1103, an open signal 262 is provided to at least one contactor 175 to cut off a battery 111 from the PM motor 191. In some embodiments, the steps of block 1101 and block 1103 are implemented substantially at the same time.

At block 1105, a second turn-on signal 263 is provided to the lower switches or upper switches of the DC/AC converter 171 to form second short-circuit loops between the lower switches or upper switches and the windings of the PM motor 191. Then power stored in the PM motor 191 can be consumed in the first and second short-circuit loops, and the PM motor 191 can be stopped in a safe manner with a decreased motor speed and a decreased back EMF voltage correspondingly.

Figure 11:
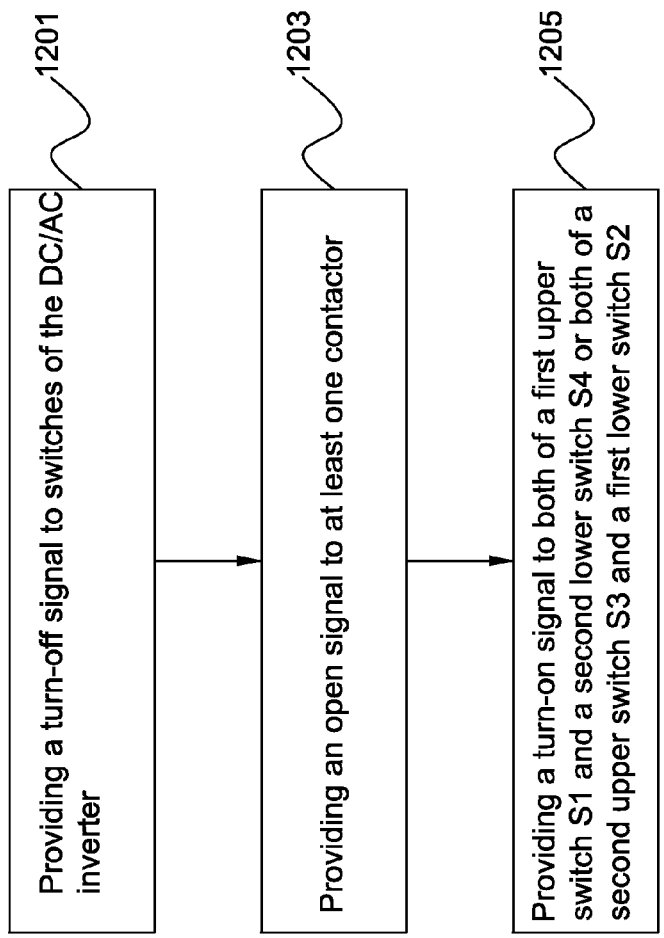
FIG. 11 is a flowchart illustrating sub-steps of providing second switch signals shown in FIG. 9 in accordance with another exemplary embodiment of the present disclosure.

FIG. 11 is a flowchart illustrating sub-steps of providing second switch signals shown in FIG. 9 in accordance with another exemplary embodiment of the present disclosure. Combined with the motor driving system 200 shown in FIG. 3, the method for operating the motor driving system 200 with the second switch signals 26 includes the following procedures.

At block 1201, a turn-off signal 264 is provided to switches of the DC/AC inverter 171 to make the DC/AC inverter 171 behave as a full bridge rectifier. At block 1203, the open signal 262 is provided to the at least one contactor 175 to cut off a battery 111 from the PM motor 191. At block 1205, a turn-on signal 265 is provided to both of a first upper switch $S_1$ and a second lower switch $S_4$ or both of a second upper switch $S_3$ and a first lower switch $S_2$ to conduct a first inductor 179 and a second inductor 181.

In some embodiments, the step of block 1201, block 1203, and block 1205 are implemented substantially at the same time. Short-circuit loops are formed among the first inductor 179, the second inductor 181 and the PM motor 191. The PM motor 191 can be stopped in a safe manner with a decreased motor speed and a decreased back EMF voltage correspondingly.

Figure 12:
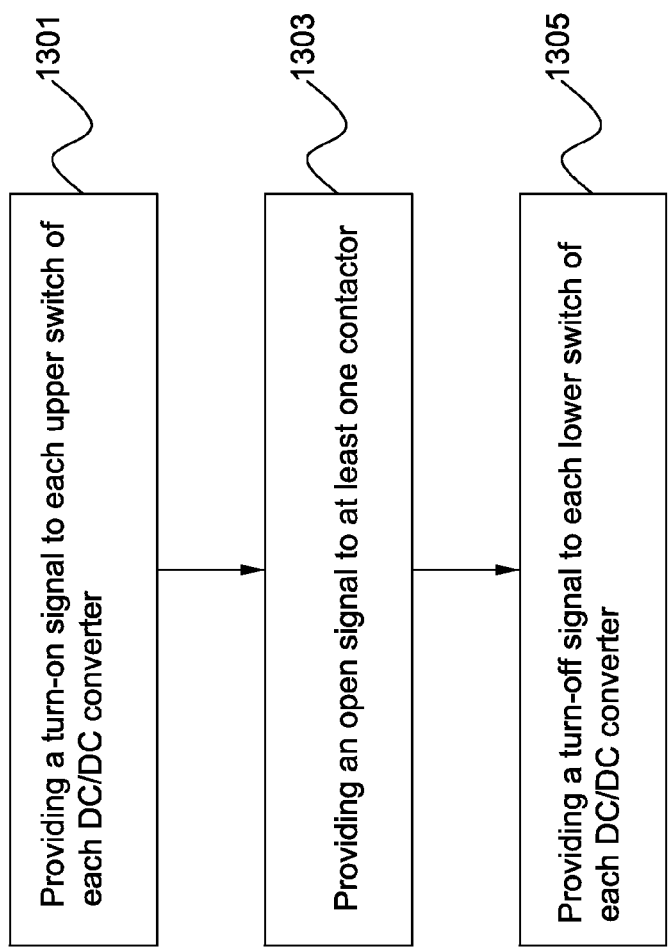
FIG. 12 is a flowchart illustrating sub-steps of providing second switch signals shown in FIG. 9 in accordance with another exemplary embodiment of the present disclosure.

FIG. 12 is a flowchart illustrating sub-steps of providing second switch signals shown in FIG. 9 in accordance with another exemplary embodiment of the present disclosure. Combined with the motor driving system 300 shown in FIG. 5, the method for operating the motor driving system 300 with the second switch signals 26 includes the following procedures.

At block 1301, the turn-on signal 266 is provided to each upper switch of each DC/DC converter. At block 1303, the open signal 262 is provided to the at least one contactor 175 to cut off a battery 111 from the PM motor 191. At block 1305, the turn-off signal 267 is provided to each lower switch of each DC/DC converter to allow the upper switches and inductors to form short-circuit loops with windings of the PM motor 191.

In some embodiments, the steps of block 1301, block 1303, and block 1305 are implemented substantially at the same time. The PM motor 191 can be stopped in a safe manner with a decreased motor speed and a decreased back EMF voltage correspondingly.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

Further, as will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

The invention claimed is:

1. A motor driving system, comprising:
    a power source;
    a contactor coupled with the power source:
    a DC/DC converter coupled with the power source, comprising:
    an H bridge, a first inductor, and a second inductor, wherein the H bridge comprises a first leg with a first upper switch and first lower switch, and a second leg with a second upper switch and second lower switch:
    a DC/AC inverter coupled with the DC/DC converter:
    a motor coupled with DC/AC inverter, the motor comprising a plurality of windings and driven by DC/AC inverter:
    a controller configured to provide first switch signals to the DC/AC inverter in a normal mode; and a protection circuit coupled with the controller, configured to generate second switch signals based on a fault signal in a fault mode, wherein the second switch signals generated by the protection circuit comprise:
    a turn-off signal provided to switches of the DC/AC inverter:
    an open signal provided to the contractor to cut off the power source from the motor; and
    a turn-on signal provided to both of the first upper switch and the second lower switch, or both of the second upper switch and the first lower switch of the H bridge to connect the first inductor and the second inductor with the windings of the motor.

2. The motor driving system of claim 1, wherein the motor comprises a permanent magnet (PM) motor.

3. The motor driving system of claim 1, wherein the fault signal is valid when a motor speed is higher than a predetermined speed.

4. The motor driving system of claim 1, wherein the DC/AC inverter comprises a plurality of bridge legs, each bridge leg comprising an upper switch and a lower switch, the plurality of upper switches are commonly coupled to a high-voltage terminal of the power source, the plurality of lower switches are commonly coupled to a low-voltage terminal of the power source, and a corresponding junction between the upper switch and the lower switch is coupled with a corresponding winding of the motor.

5. The motor driving system of claim 1, wherein the first inductor is coupled between a high-voltage terminal of the power source and an junction between the first upper switch and the first lower switch; and the second inductor is coupled between the high-voltage terminal of the power source and an junction between the second upper switch and the second lower switch.

6. The motor driving system of claim 1, wherein the fault mode comprises an uncontrollable generation (UCG) mode.

7. The motor driving system of claim 1, wherein the first switch signals provided by the controller are blocked in the fault mode.

8. A method for operating a motor driving system, comprising:

providing first switch signals to a DC/DC converter and a DC/AC inverter in a normal mode, wherein the DC/DC converter comprises:
an H bridge, a first inductor, and a second inductor, wherein the H bridge comprises a first leg with a first upper switch and first lower switch, and a second leg with a second upper switch and second lower switch; and providing second switch signals to the DC/DC converter, DC/AC inverter, and a contactor based on a fault signal in a fault mode, wherein providing second switch signals comprises: blocking the first switch signals;

providing a turn-off signal to switches of the DC/AC inverter;

providing an open signal to the contactor to cut off a power source from a motor; and providing a turn-on signal to both the first upper switch and the second lower switch or providing the turn-on signal to both the second upper switch and the first lower switch of the DC/DC converter to connect the first inductor and the second inductor with windings of the motor.

9. The method of claim 8, wherein the fault mode comprises an uncontrollable generation (UCG) mode.

10. The method of claim 8, wherein the fault signal is valid when a motor speed is higher than a predetermined speed.

* * * * *